United States Patent Office 2,733,234
Patented Jan. 31, 1956

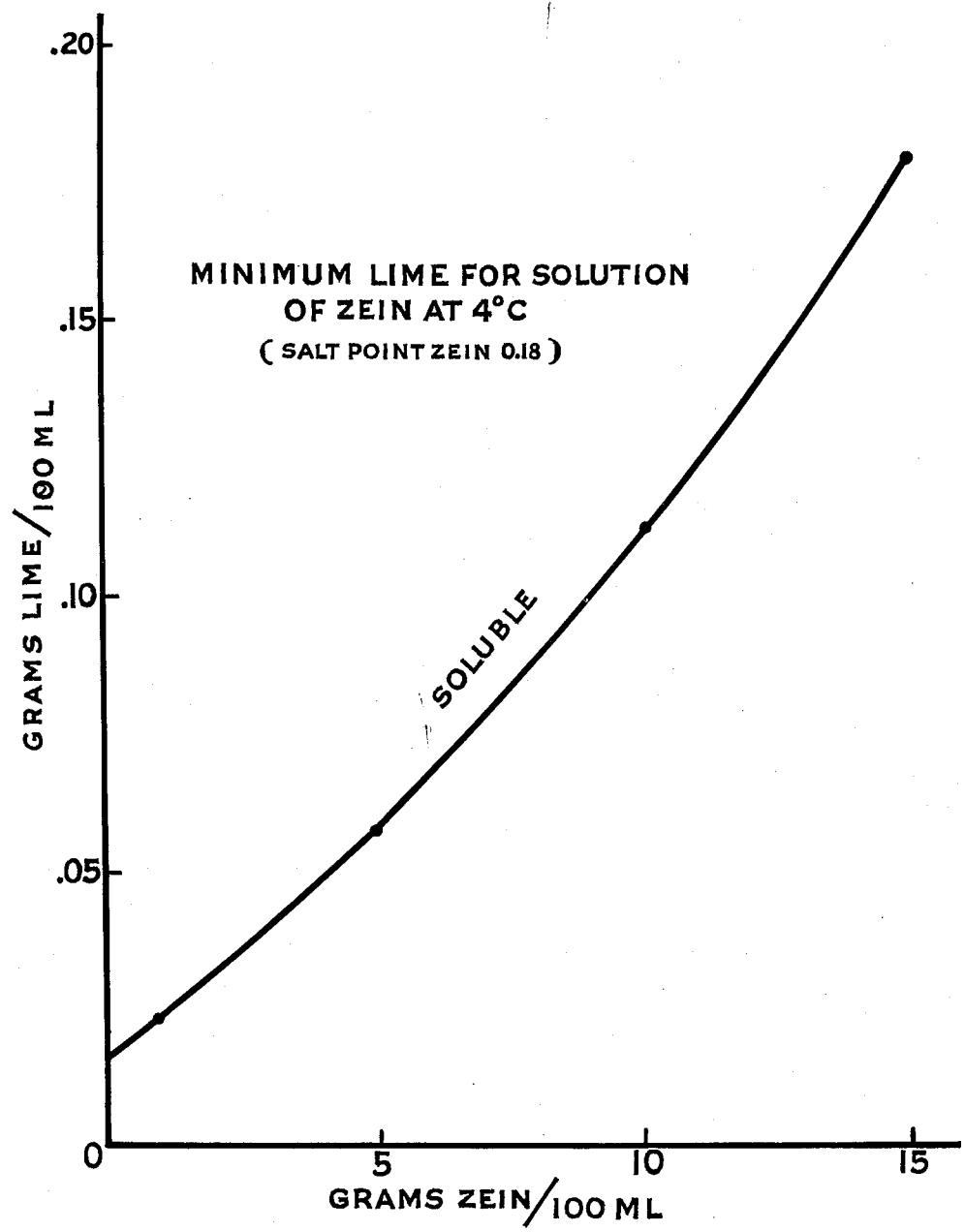

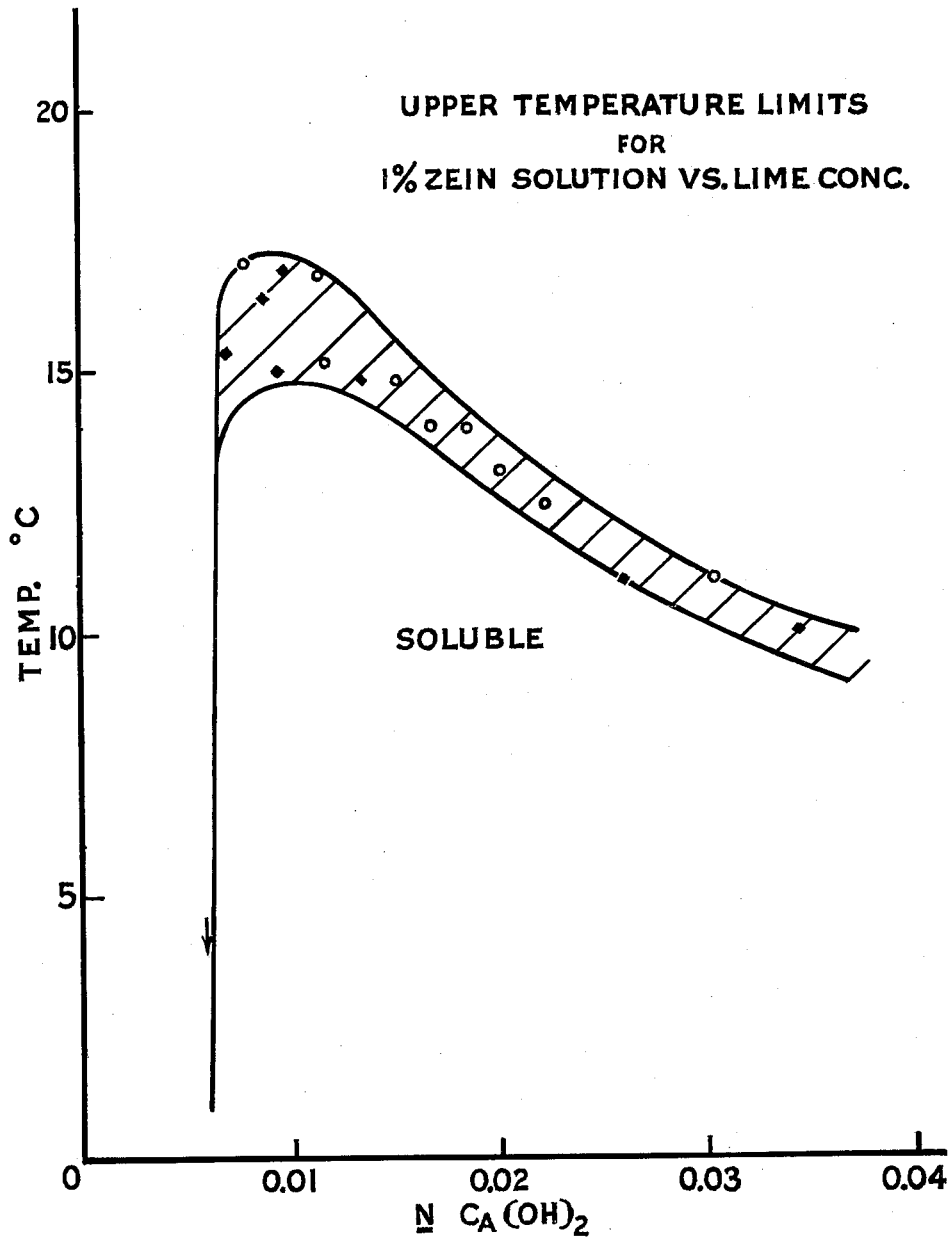

2,733,234

PURIFICATION AND RECOVERY OF ZEIN

Leo Morris, Chicago, Lloyd G. Unger, Riverside, and Alexander L. Wilson, Palos Park, Ill., assignors to Corn Products Refining Company, New York, N. Y., a corporation of New Jersey Application January 11, 1954, Serial No. 403,416

5 Claims. (Cl. 260—123)

This invention relates to the solution, purification, and recovery of zein by means of alkaline aqueous systems.

Zein is obtained commercially from corn (maize) gluten by extracting the same with hot aqueous isopropyl alcohol of 80 per cent concentration. Zein is soluble in a variety of organic solvents, singly or mixed, and with or without added water, e. g., lower aliphatic alcohols, ketones, amines, amides, and mixed and polyethers. Important uses of zein, such as coating, depend upon the ease with which it may be applied from solvent solution to give tough films, resistant to water as well as to oil. However, because of hazard and expense, there is a definite trend away from organic solvents to aqueous dispersion systems. There has been some success, for example, in depositing water-resistant coatings of zein from emulsions thereof prepared with ammonium soaps.

Zein is quite resistant to water alone within the pH range of about 2 to 10. Zein is soluble in aqueous alkalies within the pH range of 11.3 to 12.7 and the spinning of zein fibers, for example, depends upon the solubility of zein in moderately strong sodium hydroxide. The solubility of zein in aqueous alkalies is discussed by Ofelt and Evans in Ind. Eng. Chem. 41, 830 (1949). It has been shown and commonly accepted that zein is insoluble in ammonium hydroxide and calcium hydroxide solutions of any concentration.

One of the objects of this invention is to provide a new method of dissolving zein in alkaline aqueous systems. A further object is to provide new alkaline aqueous solutions of zein which can be used simply and advantageously in forming oil and moisture resistant films and in spinning zein fibers. Another object is to provide a method of purifying zein. Other objects will appear hereinafter.

We have discovered, contrary to all past experience, that zein is soluble in aqueous calcium hydroxide solutions over a certain restricted but useful range of temperature and concentration. We have found quite unexpectedly, and our invention is based on this discovery, that zein is soluble in solutions of calcium hydroxide at low temperatures. The temperature range in which prepared pure solutions of zein in aqueous calcium hydroxide exist is from the freezing point to about 17° C. Above 17° C. precipitation of zein occurs. In actual preparation of the solution, it is advisable not to employ temperatures over about 10 to 12° C.; and solution is more rapid at still lower temperature. The minimum quantity of calcium hydroxide required is about 1 per cent, based on the weight of the zein, plus 0.01 per cent based on the water. The amount of zein is not critical but above about 20 per cent of zein the viscosity is too great for easy handling of the solution.

Zein-water-calcium hydroxide systems are extremely sensitive to inorganic ions, as well as to organic solvents for zein, but tolerance is extended as the temperature is lowered. Cations of multiple charge, such as the calcium ion, particularly tend to salt out zein or to prevent its solution, as the case may be. With calcium hydroxide, its own solubility does not exceed the limit of ion concentration tolerable by zein at temperatures below about 10° C. From this temperature to about 17° C., the excess of calcium hydroxide tolerated in solution steadily diminishes. Obviously, above about 17° C. the tolerance for calcium ion is so reduced that the accompanying hydroxyl ions of calcium hydroxide are insufficient to provide solution of zein.

We have found surprisingly also that organic solvents have a pronounced effect in repressing solution of zein in aqueous calcium hydroxide. The result of any addition of a typical zein solvent, such as isopropyl alcohol, is to restrict further the narrow region of temperature and ionic concentration at which zein solutions can exist. In practice 10 per cent of isopropyl alcohol is intolerable; the amount should be under about 5 per cent of isopropyl alcohol or the equivalent of this if other solvents are used except when sodium hydroxide is added to the system as discussed hereinafter.

The zein solubility region may be extended to broaden the temperature range, and to improve the ion and solvent compatibility by adding a little sodium hydroxide to the system. One effect of such addition is to reduce the solubility of calcium hydroxide and hence the net salting-out tendency of the medium. In this way, certain processes involving zein solution can be furnished simply with the required amount of calcium hydroxide by addition of lime in excess, and still have reasonable tolerance from temperature variation and common contents of interfering impurities. Sodium hydroxide should not be substituted for part of the calcium hydroxide actually required for zein solution. Thus for pure zein the minimum requirement of lime is about 1 per cent by weight. The minimum requirement for solution of zein in crude systems containing other components, such as gluten, is sufficient lime to saturate all components thereof. In practice the amount of sodium hydroxide may be as high as but should not exceed the amount of calcium hydroxide. The temperature range at which zein is soluble in such systems is 0° to 30° C., a somewhat broader and more useful range than with lime alone. The amount of organic solvent tolerable is increased from about 5 per cent to about 10 per cent.

We have found that conditions suitable for dissolving zein in calcium hydroxide are poor conditions for solution of typical contaminants, which include related proteins, carbohydrates, fatty acids, and natural pigments present in corn (maize) gluten. As a result, zein may be purified simply by dissolving it in water, containing preferably an excess of lime, at a low temperature, filtering to remove insolubles and precipitating to recover purified zein. In some cases, additional purification is achieved simply by prior treatment of the zein in the same system at a temperature which will prevent solution of zein but will permit solution and removal of impurities broadly soluble at a high pH.

The purification brought about by solution of zein in calcium hydroxide may be used as a critically important step in the recovery of pure zein from corn (maize) gluten by a novel and highly economical method, and recovery in this manner is another object of this invention. Thus gluten may be treated with an organic solvent, e. g., isopropyl alcohol, in much smaller amount than ordinarily used to extract zein according to present commercial practice, for the purpose of rendering the zein soluble. Actually, zein, as such, does not appear to be present in large proportions in gluten; most reagents which dissolve zein at room temperature or below extract rather low yields of zein from gluten. Apparently, it is necessary to convert the zein to soluble form before it can be extracted from gluten. The best way known at present to convert zein in gluten to soluble form is to heat the gluten with organic solvents, e. g., with 30 to 80 per cent alcohol at 50 to 80° C.

The usual commercial process for zein employs as a first step a hot extraction of corn gluten with 80 per cent isopropyl alcohol or equivalent solvent. The second step may be a sodium hydroxide treatment of the extract, as disclosed by Swallen in U. S. Patent 2,332,356, to provide refinement and stabilization of product. The usual third step is a liquid-liquid extraction of the neutralized extract with hexane or equivalent hydrocarbon, as in the disclosure of Swallen, U. S. Patent 2,287,649, to remove oil and pigment. The residual solution is precipitated into cold water as a fourth major step. The precipitate is finally leached with fresh water for recovery of residual solvent and the heat sensitive product is carefully dried. The total process is characterized by low yields, high solvent usage, costly and difficult operations.

There have been many attempts to achieve important savings in the cost of zein manufacture. One line of effort has been directed to refinements of each step of the typical process. A second approach has concentrated on the initial extraction step. Thus a significant advance in zein yield, quality and processability is disclosed in copending application, Serial No. 393,506, filed November 20, 1953. The present invention represents an improvement over these.

The recovery of zein from corn gluten, by means of the present invention, involves essentially the extraction of zein therein with an organic or aqueous organic solvent, removal or dilution of the solvent, and subsequent redissolution of the zein in an aqueous lime system. The first step involves treating corn gluten with a hot organic solvent for zein, such as 30 per cent isopropyl alcohol, preferably in quantity sufficient to provide a viscous zein solution but generally insufficient to provide a separable extract. Volatile solvents, such as the lower alcohols of 30 to 90 per cent concentration, and particularly those at the lower end of range concentration, are preferred for the initial step for reasons of economy, for minimum interference in subsequent recovery and since the final products have low oil content.

The preferred method for carrying out the initial step follows the disclosure of copending application, Serial No. 393,506, which involves heating the gluten in contact with an aqueous organic solvent of 30 to 90 per cent concentration, e. g., isopropyl alcohol, containing sufficient calcium hydroxide to saturate the gluten-solvent system (at least about 4 per cent of calcium hydroxide based on the dry weight of the gluten should be used). This treatment solubilizes and extracts the zein. The temperature should preferably be within the range of 50 to 80° C. or not exceed the boiling point of the solvent and the time may vary from 2 to 200 minutes. The aforementioned treatment is preferably carried out at high solids concentration of the gluten since the solvent must be removed later. For practical operating procedure, solids concentrations under about 30 per cent are preferred.

The second step in the process is the elimination of the solvent interference. This may be done by evaporation of the solvent or by washing out the solvent at a temperature above which the zein is soluble. However, it is possible to merely dilute the solvent with water to the point where zein will be soluble in the presence of small amounts of added sodium hydroxide.

In the first two instances, the cake obtained after removal of solvent is suspended in sufficient water to provide about 10 to 15 per cent solids. Thereafter each of the systems, which already contains the prerequisite amount of lime and is now substantially an aqueous system, may be cooled with agitation preferably to below 10° C. to dissolve the zein in the aqueous lime system. The cooling and agitating steps should be carried on for at least about 15 minutes. Thereafter the system is filtered and zein may be recovered from the lime solution or extract by raising the temperature to precipitate the zein or generally by the addition of acid. Or the solution of zein may be used as such.

Our invention represents distinct advances over prior art, more particularly the disclosure of Evans in U. S. Patent 2,414,195. The major advance arises from the use of calcium hydroxide rather than of sodium hydroxide in the final solution or extraction step. The product so obtained, i. e., with the use of lime is zein rather than a mixed protein and has outstanding industrial value. Furthermore, the product obtained by means of the present invention has less color, less oil content and better solution clarity than that obtained according to the aforementioned process. The gluten-lime-system of the present invention is readily filtered, rather than one presenting an engineering challenge.

An additional application of our discovery to gluten involves the direct extraction of gluten preferably at about 10° C. (the range may be 0° to 30° C.) with an aqueous lime system containing sodium hydroxide (the amount thereof not exceeding the amount of lime) to extract a significant yield of a high quality zein-rich protein. After the extraction the system is filtered and the protein recovered from solution by precipitation with acid.

Solely aqueous processes for the extraction of useful proteins from gluten have not been successful in the past. Actually these proteins are very poorly soluble in the common reagents used for protein solution. Perhaps the best reagent of the past is hot sodium hydroxide, although our work indicates that its action is largely through soaps formed from the native oils of gluten and is greatly improved by the addition of further soap. This reagent system suffers from several disadvantages. Extraction is largely dispersive and unselective. Extracted protein is little improved in solubility over its form in native gluten, is poor in color and high in oil content. Unextracted residual material—protein, starch, fiber—becomes swollen or gelatinous and cannot be successfully filtered or otherwise separated from extract.

As pointed out, we have now discovered that remarkable results follow aqueous extraction of gluten at low temperatures in the presence of calcium hydroxide. A practical yield of a highly soluble zein-rich protein is obtained. The product is low in color and oil content. The residual material is unswollen and filterable. The reason for these surprising results is not entirely clear but must be complex. One effect may be the suppression of all soap activity and the avoidance of all non-selective protein dispersion. Another is a possible effect of calcium ion in suppressing swelling of the gluten components. Since yield decreases at higher temperature, a certain effect is due to the low temperature solubility of zein in calcium hydroxide.

Our invention is distinctly advantageous over the prior art. Pearce, for example, in U. S. Patent 2,448,002 discloses a pre-treatment of gluten with hot acid, followed by extraction with hot alkali and eventual recovery of product from a lime-salt solution at elevated temperature of a product which possesses some alcohol solubility. Among the characteristics typical of the present zein obtained by our process and lacking in the product of this past process are complete solubility in aqueous alcohols, clarity of solution in aqueous sodium hydroxide, water resistance over a broad neutral region, film-forming and fiber-spinning properties, and good color. A second advance over this art lies in the general practicality of the manufacturing operations—high yield, by-product of useful feed value, and good filterability at all stations.

The advantages of our invention will be apparent from the following examples which are merely illustrative and are not intended to be limiting in any sense.

Example 1

This example illustrates the solution of zein in the presence of excess calcium hydroxide.

Zein (15 g., salt point [1] 0.18) was added with 3 g. commercial hydrated lime to 82 g. ice water. The mixture in a closed container was shaken occasionally at about 4° C. and stored overnight at this same temperature. Haze due to impurities was removed by cold, pressure filtration. Zein was completely dissolved; viscosity paralleled that of a sodium hydroxide solution at the same concentration.

Haze developed in the solution on warming to about 14° C.; almost complete precipitation seemed to occur rapidly at 17 to 20° C. The precipitated system clarified completely as the temperature was lowered below 10° C.

The solution when spread on glass or paper at 4° C. dried to clear, adherent films which were water-resistant at room temperature. The solution when spun into water at room temperature could be drawn into fibers.

Example 2

This example illustrates the minimum requirement of calcium hydroxide for the complete solution of zein at several concentrations.

Zein (salt point 0.18) was made up at 4° C. at concentrations of 1, 5, 10 and 15 per cent in appropriately spaced mixtures of water and a saturated solution of calcium hydroxide. The minimum requirements for complete solution were determined by visual examination after a prolonged period of gentle agitation. Full data are plotted in Figure 1.

Example 3

This example discloses the maximum temperature at which various 1 per cent solutions of zein in calcium hydroxide solutions exist.

Clear solutions of zein at 1 gram per 100 ml. were prepared with various concentrations of lime-water at 4° C. Each was heated slowly and the temperature noted at which clouding occurred. Results, on two zeins, of salt point 0.14 and 0.18 are plotted in Figure 2. The upper solution boundary is indefinite to the extent indicated, but apparently without clear relation in the given region to the salt point type of the zein.

Example 4

This example indicates how sodium hydroxide within limits extends compatibility of zein solutions to higher temperatures, higher salt contents and low alcohol concentrations.

A solution of 1 per cent zein (salt point 0.14) in 0.006 N Ca(OH)$_2$ had a cloud point of about 15° C. The addition of sodium hydroxide to a normality of 0.02 extended the clouding temperature to 25° C. The same addition extended the tolerance for calcium hydroxide at 15° C. from about 0.010 N to 0.015 N. The addition of sodium hydroxide to a normality of 0.06 provided tolerance at 25° C. for 0.015 N calcium hydroxide, or for 6 per cent isopropyl alcohol at the 0.006 N calcium hydroxide level.

Example 5

This example illustrates the purification of zein prepared initially by the extraction of corn gluten with 60 per cent isopropyl alcohol in the presence of added sodium hydroxide in accordance with prior art methods.

Four grams of crude zein was mixed with and held overnight at 2 to 3° C. in 200 ml. lime saturated water. A slightly cloudy solution resulted. The solution was filtered at 5° C. and neutralized to pH 5 with hydrochloric acid. The precipitated zein was washed and dried.

|              | O. D. | Solubility in 50% Alc. |
|--------------|-------|------------------------|
| Crude zein   | 0.63  | 97%—turbid.            |
| Purified zein| .39   | 100%—clear.            |

Example 6

This example illustrates the preparation of zein from corn gluten by our novel process which involves a minimum of solvent. The zein extracted in the first step at high solids was precipitated in situ, freed of organic solvent, and then reextracted with aqueous calcium hydroxide.

A slurry of 250 g. flash-dried gluten (65 per cent protein d. b.), 15 g. commercial hydrated lime, 250 g. isopropyl alcohol and 590 g. water was heated with gentle agitation for 15 minutes at 75 to 80° C. The product was cooled to 50° C. and stirred into 3900 ml. tap water at 5° C. The whole was agitated gently for 30 minutes and was filtered directly at 27° C. The filtrate contained 5.5 per cent of the original nitrogen, largely non-protein solubles, in addition to pigment, ash and solvent.

The filter cake was resuspended in cold water to 2750 ml. and mixed with 2.75 g. lime. It was held at 2° C. over the weekend (pH 12.5), mixed with 10 g. diatomaceous earth and filtered. The filtrate, containing 67 per cent of the original gluten nitrogen, was neutralized to pH 5.2 with hydrochloric acid. The precipitated protein was filtered and dried. The product was clearly soluble in dilute sodium hydroxide and in 50 per cent isopropyl alcohol; the optical density was 0.40. It showed other typical zein properties.

Example 7

This example illustrates another preparation starting from a similar initial extraction step. In this case, the zein as originally extracted was largely retained in solution form by dilution with limewater containing sodium hydroxide. Sodium hydroxide functioned to permit a stable zein solution at 12 to 14° C. in a medium containing finally 5.9 per cent isopropyl alcohol. With greater than the given amount of sodium hydroxide, and less than the given amount of lime, filtration rapidly became impossible, non-precipitable nitrogen losses increased, protein color and oil content increased, and zein character of product was lost.

A slurry was prepared of 50 g. flash-dried corn gluten (94 per cent d. s., 65 per cent protein d. b.), 3 g. comm. hydrated lime, and 168 g. of 35 per cent isopropyl alcohol, in the given order. It was heated rapidly to 75°, held for 20 minutes with gentle agitation and cooled to 30°. A solution of 3 g. NaOH and 0.5 g. lime in 782 g. water, cooled to 5°, was added with gentle agitation. The temperature of the slurry was now 12 to 14°. It was held for 15 minutes and filtered through a sharkskin filter paper at the same temperature. The filtrate was acidified to pH 6.0 with 20 per cent H$_2$SO$_4$. The precipitate was filtered, reslurried in cold water, refiltered, and dried. The yield of product, nitrogen basis, was 62 to 65 per cent. It contained 1 per cent oil, had a salt point of 0.18, gave clear solutions in 0.05 N NaOH and in 60 per cent isopropyl alcohol, and showed low color (O. D. 0.34).

Example 8

This example discloses the range of conditions under which gluten is usefully extractable based on the criteria of yield and filterability.

Fifty grams of flash-dried gluten (65 per cent protein) was mixed with commercial hydrated lime and stirred gently with 425 ml. water for 5 minutes at 10° C. Then 5 N NaOH was added slowly in desired amount. The slurry was allowed to stand at controlled tempera-

---

[1] Salt point is defined as that ionic strength at which a solution of 1% zein in 0.05 N NaOH first clouds when titrated at 25° C. with a solution of 1.00 N NaCl in 0.05 N NaOH.

ture and was then filtered in a Hormann laboratory filter with No. 0 pad at 20 p. s. i. Filtrate volume at 1 minute was recorded. Yield was calculated on the basis of nitrogen concentration in filtrate; net yield was corrected for protein not precipitable at pH 5. Typical data follow:

| Lime, Percent | NaOH, Percent | Temp., °C. | Time, Hr. | Filtrate, ml./min. | Extraction | |
|---|---|---|---|---|---|---|
| | | | | | Yield, Percent | Net |
| 0 | 6 | 10 | 16 | 0 | ------ | ---- |
| 4 | 6 | 10 | 16 | 0 | ------ | ---- |
| 6 | 6 | 10 | 16 | 80 | 36 | ---- |
| 8 | 6 | 10 | 16 | 100 | 31 | ---- |
| 10 | 6 | 10 | 16 | all | 32 | 25 |
| 8 | 2 | 10 | 16 | all | 23 | ---- |
| 8 | 4 | 10 | 16 | all | 28 | ---- |
| 8 | 6 | 10 | 7 | all | 32 | 26 |
| 8 | 6 | 27 | 8 | 100 | 29 | 20 |

Optimum yield and filterability point to the use of about 8 per cent lime and 6 per cent NaOH, gluten basis, at a temperature of 10° C. Under these conditions net yields of 25 per cent are obtainable, given thorough water washing of filter cake.

*Example 9*

This example shows a larger scale preparation than Example 8 with recovery of product under the preferred conditions.

Six hundred grams of flash-dried gluten, 48 g. calcium hydroxide and 5 liters of water were mixed for 10 minutes at 20° C. Thirty grams of sodium hydroxide (as 20 per cent solution) was added and mixed in for 5 minutes. The slurry was held at 10° C. for 16 hours, gently agitated and filtered directly. The clear filtrate contained 70 g. protein. Of this 80 per cent was precipitable at pH 5 and recoverable. The product had the following properties:

Oil content _____ 2%
Salt point _____ 0.19
Solubility in 65% isopropyl alc 65%
Solubility in dilute NaOH ___ Complete, giving brilliant, viscous solutions.
Optical density [1] _____ 0.8

[1] Optical density of 2.5% solution in 0.05 N NaOH as measured in a 1 cm. cell at 440 mµ.

We claim:

1. The process of purifying zein which comprises dissolving the zein in aqueous calcium hydroxide at a temperature below about 10° C., separating impurities and recovering zein from said purified solution, the amount of calcium hydroxide being at least about one per cent by weight of zein.

2. In a process for recovering from corn gluten zein which has been solubilized by heat treatment with an organic solvent for zein, the improvement which comprises extracting at a temperature below 20° C. the zein into a substantially aqueous medium containing at least about 4 per cent of calcium hydroxide by weight of the gluten.

3. In a process for recovering from corn gluten zein which has been solubilized by heat treatment with an organic solvent for zein, the improvement which comprises extracting at a temperature below 20° C. the zein into a substantially aqueous medium containing at least about one per cent of calcium hydroxide by weight of the zein.

4. Process according to claim 3 wherein sodium hydroxide is added to said aqueous medium in amount not exceeding the amount of calcium hydroxide and the temperature is below about 30° C.

5. The process of extracting from corn gluten a soluble protein containing a major proportion of zein which comprises treating said gluten at 0° to 30° C. with water containing not more than 6 per cent of sodium hydroxide and not less than 6 per cent of calcium hydroxide by weight of gluten.

References Cited in the file of this patent

UNITED STATES PATENTS

| 1,320,508 | Sweet | Nov. 4, 1919 |
| 2,332,356 | Swallen et al. | Oct. 19, 1943 |

FOREIGN PATENTS

| 657,438 | Great Britain | Sept. 19, 1951 |

OTHER REFERENCES

Swallen: Ind. and Eng. Chem., vol. 33, p. 396 (1941).
Pominskii et al.: J. Am. Oil Chemists Soc., vol. 30, pp. 88–89 (1953).